United States Patent
Woodell

[15] 3,655,498
[45] Apr. 11, 1972

[54] PLEXIFILAMENTARY STRUCTURES PREPARED FROM NON-CRYSTALLINE SYNTHETIC ORGANIC POLYMERS

[72] Inventor: Rudolph Woodell, Richmond, Va.
[73] Assignee: E. I. du Pont de Nemours and Company, Wilmington, Del.
[22] Filed: Sept. 11, 1970
[21] Appl. No.: 71,582

Related U.S. Application Data

[63] Continuation-in-part of Ser. No. 677,949, Oct. 25, 1967, abandoned.

[52] U.S. Cl.....................161/172, 161/181, 161/402, 264/205
[51] Int. Cl........................................................D02g 3/00
[58] Field of Search..............57/140; 264/205; 161/172, 173, 161/177, 181, 165, 402

[56] References Cited

UNITED STATES PATENTS

| | | | |
|---|---|---|---|
| 3,069,406 | 12/1962 | Newman et al. | 161/172 X |
| 3,081,519 | 3/1963 | Blades et al. | 57/140 |
| 3,227,794 | 1/1966 | Anderson et al. | 264/205 |
| 3,290,207 | 12/1966 | Magat et al. | 161/178 |

FOREIGN PATENTS OR APPLICATIONS 891,943  3/1962  Great Britain

Primary Examiner—Robert F. Burnett
Assistant Examiner—Roger L. May
Attorney—Gary A. Samuels

[57] ABSTRACT

Plexifilamentary structures prepared by flash-spinning solutions of non-crystalline synthetic organic polymers. The structures show no long-period diffraction when subjected to small-angle X-ray analysis, and consist of a three-dimensional plexus of interconnected fibrils, which are in turn composed of uniaxially oriented film-fibril elements of the polymer.

7 Claims, 1 Drawing Figure

PATENTED APR 11 1972  3,655,498
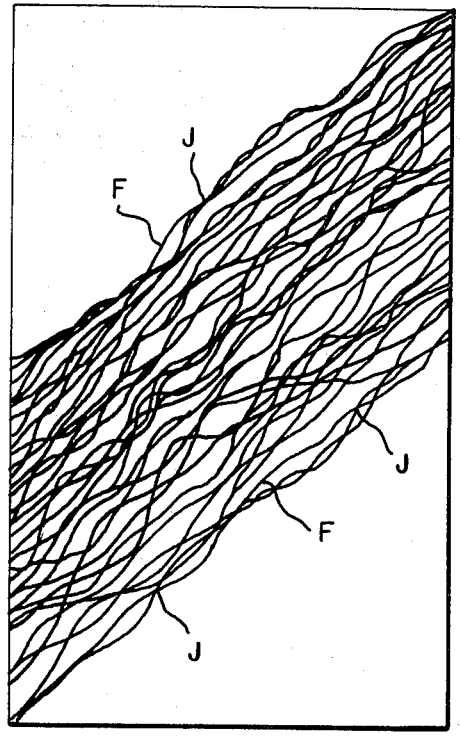
INVENTOR
RUDOLPH WOODELL
BY  *Gary A. Samuels*
ATTORNEY 3,655,498

PLEXIFILAMENTARY STRUCTURES PREPARED FROM NON-CRYSTALLINE SYNTHETIC ORGANIC POLYMERS

CROSS-REFERENCE TO RELATED APPLICATIONS

This application is a continuation-in-part of application Ser. No. 677,949, filed Oct. 25, 1967 now abandoned.

BACKGROUND OF THE INVENTION

1. Field of the Invention

This invention concerns plexifilamentary structures prepared from non-crystalline synthetic organic polymers showing no long period diffraction when subjected to small-angle X-ray analysis. More particularly it is concerned with such products in the form of continuous highly fibrillated strands, tapes, or sheets of three-dimensionally interconnected fibrils, which structures have good strength, high covering power and high surface area, and which are useful, e.g., as textiles, sheet products, and filters.

2. Description of the Prior Art

In preparing fabrics, both woven and nonwoven, sheet products, cordage, filter elements and similar products, the art has long recognized that by employing low denier per filament staple fibrous components, one advantageously realizes higher bulk, higher cover, and higher surface area, than when employing continuous filament fibrous components. Traditionally, synthetic (i.e., man-made polymers have been converted into fiber form by various extrusion processes, e.g., melt spinning, dry spinning, and wet spinning, which yield continuous filaments intead of short length staple. Examination of the art reveals many attempts to circumvent the feasible but expensive multi-step process of drawing such continuous filaments to orient and strengthen the fibers, cutting the fibers to staple length, carding, twisting, and drafting to ultimately obtain the desired high bulk, high cover staple product.

These prior art staple producing processes may be classified into several groups, one of which involves first preparation of sheets, bands, foils, ribbons or strips of the synthetic polymer which are next highly drawn to produce a maximum degree of polymer orientation followed by brushing, twisting, bending, beating, vibrating or similar mechanical operations to shatter the strip by forming numerous longitudinal fissures parallel to the direction of high molecular orientation. The resulting irregular fragments crudely resemble the individual fibers in the classically produced products. Although such mechanical fibrillation techniques can apparently be made to operate on both amorphous and crystalline synthetic polymers, they are restricted to those polymers which can be highly oriented by drawing in order for the product to be fibrillatable. Furthermore, the products are inherently only "two dimensional" (even though twisted or rolled), having been produced from flat sheets or strips. The degree of fibrillation, e.g., fineness of individual fibrils, is considerably coarser than provided by the present invention, and frequently there is an appreciable loss of polymeric material in this process since many of the fragments may be completely separated from the parent oriented sheet or strip during the fibrillation step.

Another group of prior art processes seeking a short cut to staple-like products involves melt extrusion of mixtures of two or more incompatible polymers into fibers or sheets, followed sometimes by a drawing step, and then either a mechanical "working" to cause separation of the two polymeric components into the desired fragments, or else an extraction or dissolution of one polymer to leave behind fragments of another. Such products have far coarser fibrils than the products of the present invention, they fail to exhibit the desired film-fibril character, and as might be expected control of the character of the product is difficult. In what may be considered a variation of this technique, other prior art processes prepare foam filaments or sheets which are stretched or mechanically worked to destroy a part of the polymeric cell faces to leave a "fibrous" residue of interconnecting struts corresponding to the original thickened polymer regions at the intersections of adjacent cell wall faces. Such products have the same shortcomings mentioned above, when compared to the products of the present invention.

Somewhat more closely related prior art involves a "flash extrusion" process wherein a solution of a crystalline synthetic organic polymer in an activating liquid under superatmospheric pressure and at a temperature in excess of the boiling point of the activating liquid is abruptly extruded through an orifice into a region at lower pressure. The resulting essentially adiabatic flash evaporation of the activating liquid precipitates the polymer in the form of numerous fibrils which are interconnected at their ends in a three-dimensional array to form a plexifilamentary product. The individual fibrils are less than 4 microns thick and are comprised of highly oriented polymer, presumably resulting from the extremely high shear occurring in the extrusion orifice and/or during the flash evaporation of the activating liquid. Features of this process are that the polymer be crystalline and that the activating liquid be a nonsolvent below its atmospheric boiling point.

SUMMARY OF THE INVENTION

The present invention concerns plexifilamentary products, e.g., strands, tapes and sheets, composed of a synthetic organic non-crystalline polymer exhibiting no small-angle X-ray diffraction, which products consist of fibrils less than five microns thick interconnected at each end in a three-dimensional array to form a continuous plexus and which fibrils in turn consist of film-fibril elements less than 1 micron thick which exhibit uniaxial molecular orientation. Said products have a minimum surface area of 2 m.$^2$/g., a minimum tenacity of 0.1 gpd, a minimum free fibril count of 50/thousand denier/0.1 mm. length, and a density within 2 percent of that of the solid materials from which they are made. These products are sometimes referred to hereinafter as plexifilaments. Although some of these features individually have been known in some prior art products, the present invention for the first time combines them all to provide a new and desirable product. The continuous nature of the plexifilaments comprised of three-dimensionally interconnected fibrils, and their high surface area, tenacity and free fibril count have been approached only by the above-mentioned flash extrusion prior art. However, in contrast to that art, the present invention has succeeded in providing such products of non-crystalline polymers so that for the first time plexifilaments which are inherently flameproof (polyvinyl chloride) or which are soluble at room temperature (plexifilaments useful as "fugitive" or "adhesive" yarns) or which have other desirable and unique properties may be prepared. Furthermore, the individual film-fibrils of the plexifilamentary products of this invention have uniaxial molecular orientation as contrasted with the less efficiently drawable planar-axial molecular orientation of the fibrils of the crystalline polymers of the prior art. In addition, the plexifilaments of this invention have the unique ability to become self-bonded under suitable applied pressures at temperatures of a few degrees above Tg without destruction of the identity of the individual fibrils. This highly desirable property permits sheet products of these plexifilaments to be bonded (stabilized) by simple calendering without requiring critical temperature and pressure control and without appreciable loss of opacity of the sheet product.

DESCRIPTION OF THE DRAWING

The drawing is a greatly magnified representation of a plexifilament. The great majority of the fibrils "F" are joined at each end to other fibrils of the plexifilament in a three-dimensional array, i.e., each fibril tends to lie roughly parallel to the major axis of the plexifilament while interpenetrating the array of adjacent fibrils in a random fashion before terminating at a junction such as indicated by points "J." Such three-dimensional distribution of tie-points provides a coherent stable product with high "internal mobility" and good realization of the high tenacity potential.

DESCRIPTION OF THE INVENTION

The flash extrusion prior art teaches that the polymer should be crystallizable and that below its normal boiling point the activating liquid must be a non-solvent for the polymer. These requirements were thought to be necessary in order to stabilize and preserve the nascent plexifilamentary structure, i.e., at least by the time flash evaporation of the activating liquid quenched the plexifilamentary residue to the temperature of the boiling point of the activating liquid, the identity of the tiny film-fibrils would be preserved since any residual activating liquid present at that point would no longer be a solvent for the crystalline polymer. Furthermore, the ability of the polymer to crystallize not only increased the stability of the plexifilaments by forming crystalline "crosslinks" as well as by providing a polymer more likely to "set-up" or "gel" from solution, but appeared also to have some bearing on the operability of the extrusion process itself. In fact, although some attempts at flash extrusion of amorphous polymers had been made, no continuous strong highly fibrillated products had resulted, prior to the present invention.

In preparing the plexifilaments of this invention, it is ordinarily desirable to use high temperatures and pressures as well as a pressure let-down region which allows single-phase solution stable at the higher pressure to be converted to a two-phase liquid system just upstream of the final extrusion orifice. It has been found that in flash-spinning non-crystalline polymers, solvents which dissolve the polymer below their normal boiling points, can be used. When such solvents are used, high extrusion temperature and pressure helps lead to a "drier" product, i.e., to a product which will retain a minimum quantity of solvent at the end of the extremely brief flash-evaporation period, and thus avoid solvent-coalescence of the individual film-fibrils. When a solvent is used which does not dissolve the polymer at temperatures below its boiling point, of course, it is not necessary that the as-spun product be "dry." Nevertheless, high extrusion temperature and pressure, and extrusion of a two-liquid phase system, as taught in U.S. Pat. No. 3,227,794, are desirable in order to provide improved levels of continuity, uniformity, and degree of fibrillation.

The following specific considerations are useful in selecting suitable process conditions for any given polymer:

a. The selection of solvent. The solvent employed should (1) have a boiling point below the flow temperature of the polymer in order that adiabatic flash-evaporation of the solvent can quench the fibrils to a low enough temperature that they are form-stable, i.e., do not flow and fuse together, (2) be suitably non-reactive with the polymer, e.g., not degrade, crosslink, hydrolyze, etc., the polymer unduly at extrusion temperatures, and (3) have just the right degree of solvent power to be able to form a single-phase solution of the polymer at the extrusion temperature but still form a two-liquid phase system at the same temperature when the pressure on the solution is reduced in the let-down chamber.

A simple test to determine whether a given solvent will be suitable for spinning a given polymer may be run as follows. A mixture of the polymer plus the solvent calculated to give, say a 10 weight percent solution, is sealed in a glass tube (quantity of mixture chosen to occupy about one-third to one-half the volume of the tube) and heated at autogenous pressure. If a single-phase flowable solution is not formed in the tube at any temperature below the solvent critical temperature, $T_c$, (or the polymer degradation temperature — whichever is lower), the solvent power is too low. At the other extreme, if a single phase solution is formed at some temperature below $T_c$, but such that the solution cannot be converted to a two-liquid phase system on being heated to a higher temperature (still below $T_c$), the solvent power is too high. Solvents whose inherent solvent power fails to fall within these extremes may frequently be made suitable by dilution with either a non-solvent or a good-solvent additive, as appropriate. After choosing a suitable solvent or solvent mixture the single-phase/two-liquid-phase boundary behavior as a function of temperature and pressure with various polymer concentrations is determined as described (and illustrated in FIG. 5) in U.S. Pat. No. 3,227,794.

b. Selection of temperature and pressure. An extrusion temperature preferably within 40° C. of the critical temperature ($T_c$) of the solvent, most preferably a few degrees below $T_c$, is chosen. If for some reason, e.g., polymer degradation, lower temperatures must be employed, adequate bubble nucleation on flash extrusion may be assured by adding a nucleating agent, e.g., a particulate material such as a silica aerogel, and/or an inert low-boiling liquid such as nitrogen, to the spin solution. In any case, the extrusion temperature must at least be appreciably above the solvent's boiling point at the prevailing external pressure in order to achieve flash-evaporation and rapid quenching.

A solution pressure roughly 200–300 psi above the phase boundary at the extrusion temperature is conveniently employed, and a pressure drop to a value some 200 p.s.i. below the phase boundary is provided between the solution source and the let-down chamber. This lower pressure in the let-down chamber should still be well above the vapor pressure of the solvent at the extrusion temperature in order to prevent pre-flashing of solvent inside the chamber. Note that, if necessary the phase boundary pressure at the extrusion temperature may be shifted into a desirable and convenient range, say, 1,000-2,000 psi, by altering the solvent power with a suitable choice and quantity of solvent additive.

c. Selection of concentration. A polymer concentration in the range from about 10–40 percent by weight is ordinarily suitable for preparing the highly fibrillated continuous products of this invention. In general, the continuity of the product is improved by increasing the polymer concentration, and the degree of fibrillation is increased by decreasing the polymer concentration. Extrusion may be either batch-wise from a heated pressure vessel, or continuous, as from a suitable extruder.

The plexifilamentary products of this invention may be better understood from the following discussion of the terms used in the definition:

a. "Synthetic organic polymer" denotes a polymeric compound of at least film-forming molecular weight whose constituent atoms are selected predominately from the group consisting of C, H, O, N, S, and halogens, and which is manmade, i.e., has been built up from monomer units be either condensation or addition polymerization, and includes homopolymers and copolymers, or has been chemically modified from its naturally occurring state, e.g., cellulose acetate. Since the process for preparation of the plexifilaments of this invention requires flash extrusion of a solution, only linear synthetic organic polymers will have the required solubility. However, once the plexifilamentary product has been formed, the polymer may be crosslinked, if desired, by supplementary chemical or radiation treatments.

b. "Small-Angle X-ray diffraction" is defined in Chapter 6, "Small-Angle Studies of Polymers," of Newer Methods of Polymer Characterization, Bacon Ke, editor, Interscience, 1964. Crystalline polymers possess by definition regions of three-dimensionally regularly ordered molecules, and it is these regions which give rise to small-angle X-ray diffraction. Such crystalline polymers are excluded from the present invention. Polymers normally referred to as "amorphous," e.g., polystyrene, polyvinyl chloride, polymethylmethacrylate, etc., as well as those exhibiting only two-dimensional order, e.g., polyacrylonitrile, are encompassed by the term "polymers exhibiting no small-angle X-ray diffraction." These polymers will also fail to show strong X-ray wide-angle 3-dimensional-crystallinity diffraction patterns.

c. "Fibrils" denotes the individual fibrous elements of which the plexifilaments are constituted. The fibrils are connected at each end to other fibrils in a three-dimensional array. Thus, although any given fibril lies generally parallel to the plexifilament axis, it is intertwined with its neighboring fibrils in a random three-dimensional array before terminating in junction to other fibrils at each end. It is these individual fibrils which roughly correspond to the individual staple fibers in conventional prior art spun yarns.

d. "Continuous plexus" means that the plexifilament is continuous in the sense that it has useful strength (i.e., greater than 0.1 gpd) and coherence over lengths many times greater than the length of its individual fibril components, that is for lengths of the order of at least several centimeters and greater.

e. "Film-fibrils" are the basic units of which the fibrils are built. The individual film-fibrils have thicknesses averaging less than 1 micron as measured with an interference microscope. Average thicknesses less than one-half micron are preferred since such film-fibrils provide improved opacity and covering power as their thickness approaches the wavelength of light and since the surface-to-volume ratio desirably increases as thickness decreases. The width of a film-fibril is greater than its thickness, and its length will commonly be several millimeters or more. The individual film-fibrils may occur as ribbons (which sometimes are folded or rolled about their long axis) or tubes, or they may also occur as multi-layer "laminates." Any of these configurations may constitute the "fibrils" defined above. Thus, an individual fibril may correspond to a single film-fibril or an aggregate of film-fibrils. As a limit on the size of the film-fibril aggregates, the optical thickness of the fibrils will not be more than 5 microns, again determined with the interference microscope.

f. "Uniaxial molecular orientation" of the film-fibrils means that the distribution or orientation of polymer molecules within each film-fibril is biased exclusively in a direction parallel to the long axis of the film-fibril. The level of perfection of this orientation may range from very low to very high, but must always be of the stated type.

Any sample having uniaxial molecular orientation will have an optical indicatrix corresponding to an oblate or prolate spheroid with the unique axis parallel to the preferred direction of molecular orientation (in the present case, the length of the film-fibril). In contrast, a sample having planar-axial orientation will have an optical indicatrix having three unequal indices of refraction in the principal directions, the two extreme values occurring parallel to the length and thickness directions of a ribbon-shaped (film-fibril) sample.

Accordingly, for the purposes of this invention, uniaxial orientation may be readily distinguished from planar-axial orientation by the following simple optical test: the birefringence of the film-fibrils is observed with a polarizing microscope as the sample, placed on a universal stage, is tilted from normal incidence to an angle of 90° about an axis parallel to the width direction of the film fibril. The uni-axial film-fibrils of the present invention will exhibit an initial birefringence at normal incidence characteristic of the polymer and level of axial orientation, and although the absolute value of the birefringence may change during the tilt test, it always remains of the same sign or 0. In contrast, film-fibrils having planar-axial orientation will exhibit a change in sign (e.g., go through and post 0) as the sample is tilted from the normal incidence (0°) to 90°. This birefringence behavior is a direct consequence of the characteristic optical indicatrices associated with these two different forms of molecular orientation.

Since many universal stages in common usage permit tilt angles only up to about 50° to 60°, the complete "birefringence tilt" test is conveniently run in two overlapping ranges: say, 0° to 50° tilt and 40° to 90° tilt. First, a few film-fibrils dissected from the plexifilament sample are placed with a suitable immersion oil between a microscope slide and cover glass, and birefringence observations on individual film-fibrils from normal incidence through 50° tilt are made. For the second part of the test, a few additional film-fibrils are cast in a suitable embedding medium and cross-sections 15 to 20 microns thick are cut. These sections are again placed in an immersion oil between the slide and cover glass for the birefringence observation from 40° to 90° tilt. (Note that when the slide and cross-section are perpendicular to the light beam, i.e., "untilted," the cross-sectioned film-fibrils "stand on end," i.e., are at 90° "tilt," so that rotation of the slide and stage to 50° can bring the sample tilt angle down to 40°.) "Suitable" immersion oils and embedding media will be those which (1) do not dissolve or plasticize the film-fibrils, and (2) have an index of refraction closely matching, e.g., within a few per cent, that of the film-fibril, as previously determined with an interference microscope. Thickness and index of refraction measurements with the interference microscope are discussed in "Interference Microscopy," Krug, Reinitz & Schulz, translated by J. H. Dickson, published by Hilger & Watts, Ltd., 1964; and birefringence measurements, optical indicatrix and the universal stage are described in Crystals and the Polarizing Microscope, Hartshorne & Steuart, published by Edward Arnold Ltd., London, 3rd Edition, 1960.

It is postulated that the flash-extrusion process provides periods of very high shear as the solution extrudes through the orifice and as flash evaporation (expansion) of the solvent occurs. The "orifice shear" could lead to an axial molecular orientation component and the "expansion shear" could provide both axial and planar molecular orientation components. Since it has been observed that relatively high levels of both axial and planar molecular orientation persist in the solid film fibrils prepared from crystalline polymers, it appears that the rapid quenching during adiabatic flash evaporation preserves a large part of these shear-generated orientations, partly because the activating liquid becomes a non-solvent as the temperature drops and partly because formation of polymer crystallites locks-in the orientation. In contrast, film-fibrils of non-crystalline polymer plexifilaments have a completely different structure, since only uniaxial molecular orientation is observed, and even this is frequently at relatively low levels. It is assumed that the initial high levels of axial and planar molecular orientation are also generated during flash extrusion of non-crystalline polymers, but that essentially all of the planar orientation and much of the axial orientation relax before complete solidification can occur since no locking-in by crystallization is possible and since small residual amounts of solvent will plasticize these structures even at temperatures below the solvent boiling point, at least for sufficiently long period of time for orientation relaxation to occur.

These differences in orientation for non-crystalline polymer plexifilaments have several advantages for certain purposes. First, the proposed relaxation mechanism corresponds to and provides a type of "annealing" treatment whereby any flaws in the nascent fibrils have an opportunity to be "healed." Secondly, the lower level of molecular orientation provides a more readily soluble structure which is advantageous for "fugitive" or "adhesive" plexifilament applications. Finally, the unique type of relaxation from the hypothesized initial transient high level of molecular orientation provides a more readily and efficiently drawable structure when products of higher levels of tenacity are required. For example, high levels of axial orientation corresponding to X-ray orientation angles of less than 30° are attained at draw ratios of only 1.5–2.0X for polyacrylonitrile plexifilaments of this invention, while ordinary polyacrylonitrile fibers normally require draw ratios in excess of 3X to reach similar levels of orientation. (When higher tenacity plexifilaments are specifically desired, higher levels of axial orientation may also be directly spun-in by special techniques to be described below.)

g. "Surface area" is determined in the normal fashion by nitrogen adsorption, using essentially the procedure and apparatus described in Faeth, P. A., Willingham, C.B., "Technical Bulletin on the Assembly, Calibration, and Operation of a Gas Adsorption Apparatus for the Measurement of Surface Area, Pore Volume Distribution, and Density of Finely Divided Solids," Mellon Institute of Industrial Research, Sept. 1955. In this procedure, the surface area is calculated from the amount of nitrogen adsorbed by the sample at liquid nitrogen temperature by means of the Brunauer-Emmet-Teller equation using a value of 16.2 square angstroms for the cross-sectional area of the adsorbed nitrogen molecule. The plexifilamentary products of this invention have a surface area of at least 2 m.²/g. These extremely high surface to volume ratio products thus have high covering power and whiteness, as well as many special purpose advantages such as ready accessibility to chemical agents, e.g., reactants, solvents, and plasticizers.

h. "Tenacity" is defined in the usual manner as breaking strength, measured in grams/denier on plexifilaments given a standard twist of 10 turns/inch (4 turns/cm.) prior to testing. The minimum value of 0.1 gpd for the present plexifilaments is adequate to allow handling through various mechanical processes such as winding, weaving, etc. Of course, for many purposes even higher strengths are desirable and values of at least 0.5 gpd are preferred. Tenacity measurements on tape or sheet-like plexifilaments may conveniently be performed on thin longitudinal strips cut from the sample.

Higher strength plexifilaments generally require higher levels of uniaxial polymer orientation in the individual film-fibrils. At least two methods are available to achieve higher tenacities. First, the plexifilaments may be drawn in one of the usual processes, e.g., hot roll, hot plate, or steam tube, just as conventional yarns are drawn and oriented to improve tenacity. A second technique is to provide an appropriate shroud down-stream from the final extrusion orifice so that the copious quantities of vapor generated during flash evaporation of the superheated solvent are directed to flow coaxially with the nascent plexifilaments. Presumably, this high velocity vapor stream either accelerates and elongates the plexifilament or in some other way helps produce or preserve higher levels of uniaxial molecular orientation.

i. "Free-fibril count" is an arbitrary test which measures the fineness of degree of fibrillation of the plexifilament. For the purpose of this invention, the free fibril count is determined by immersing a segment of a strand-like sample of the plexifilament (i.e., similar to those employed for tenacity determinations) in water containing a small amount of wetting agent such as "Triton" X–100, a product of Rohm & Haas. The wet sample is frozen using a bath of liquid nitrogen and is transferred to a freezing microtome where cross-sections are cut 0.1 mm. thick. Each section is thawed and dispersed in a drop of water on a microscope slide. After the water has evaporated, the number of fragments in each section is counted under a microscope at about 50X magnification. The average number of fragments per section is used as a quantitative measure for the degree of fibrillation. The test is run on three sections separated from each other along the length of the sample and the results are averaged. The average denier is determined by weighing a few centimeters of the sample. Then the data are reported as free fibrils/1,000 denier/0.1 mm. length. The 0.1 mm. thickness of the section (length of the cut plexifilament sample) is arbitrarily chosen to minimize the number of fibrils which will be bound together by junction points within the tested length. The plexifilaments of this invention have free fibril counts of at least 50/1,000 denier/0.1 mm. length, and values of 1,000/1,000 denier/0.1 mm. length and greater are frequently observed and preferred. Note that this latter limit requires the average fibril to have a denier less than 1.0.

j. Density of the plexifilament is determined by liquid displacement conveniently employing the common pycnometric or density gradient tube methods. In view of the extremely high surface-to-volume ratio for these materials, it is important to choose a liquid which sill suitably wet the polymer in question, and often the use of wetting agent additives will be found desirable. Ordinarily, the first density measurement will be somewhat low because of the failure of the liquid to completely wet the polymer. Consequently, a series of measurements should be made at 2–3 hour intervals until a constant value is obtained. Of course, the liquid chosen for the density measurement should be one which does not soften or swell the polymer. The requirement that the density of the plexifilaments of this invention be within 2 percent of that of the solid materials from which they are prepared assures a high level of "freeness" or "cleanness" of fibrillation, e.g., no appreciable contamination from foam-like or incompletely fibrillated material (which would prevent liquid penetration and lead to lower apparent densities) is permissible. Such cleanly fibrillated plexifilaments obviously make the most efficient use of the polymer, provide higher bulk, opacity and surface area and are more accessible to subsequent solvent, plasticizer or chemical cross-linking treatments.

The "density of the solid materials" from which the plexifilament is made can be obtained quite readily. The composition of the plexifilament is determined by usual chemical analyses and a mixture of this chemical composition (i.e., polymer plus solid additives) is made, melted and molded into a solid object of known dimensions. The weight of the object is divided by its volume to give the density. Alternatively, the density of the solid material from which the plexifilament is made can be calculated simply by summing the products of the weight fraction and density of each component in the composition. Thus, $d$ (solid materials) $= w_1 d_1 + w_2 d_2 + \ldots + w_n d_n$ where $d$ is the density, $w$ is the weight fraction and the subscripts refer to each of the $n$ components which make up the chemical composition of the plexifilament. Common polymer additives include pigments, antioxidants, delusterants, anti-static agents, ultraviolet stabilizers, and the like.

The plexifilaments of the present invention have utility in a great variety of applications. They may be used as textile strands in both woven and nonwoven fabrics to provide high cover, high bulk, and soft supple hand. Alternatively, they may be used as one component in such fabrics, subsequently to be treated with a solvent or plasticizer to convert the plexifilament into an "internal" adhesive to bond and stabilize the fabric, or an "external" adhesive to facilitate lamination of such fabrics to various other materials. Such solvent treatment may even be extended to dissolve the plexifilamentary component entirely, leaving behind a lace-like residue. By using suitable auxiliary equipment (e.g., baffles, conveyor belts, etc., as taught in U.S. Pat. No. 3,227,794 and U.S. Pat No. 3,277,526), the plexifilaments may be deposited directly to form a non-woven sheet product; or by using slot-shaped orifices and/or shrouds, plexifilamentary tapes or sheets may be produced directly. Paper-like sheet products having excellent long term high temperature (170° C.) and moderate temperature (130° C.) electrical insulation properties may be prepared from polysulfone and polycarbonate (Lexan) plexifilaments, respectively. The bulky high surface plexifilaments are also useful in filter elements.

EXAMPLES

Examples I through VI (see Table I) illustrate preparation of the plexifilamentary products of this invention from various polymers. The stated quantity of polymer is weighed into a steam-jacketed stirred autoclave of 18,000 ml. volume. The autoclave is sealed, the air in the autoclave is evacuated, the liquid components added, and stirring and heating are commenced. The internal pressure during the first phase of heating is substantially equal to the vapor pressure of the solution. However, as heating continues, the solution expands to "fill" the autoclave, at which point the rate of pressure rise increases abruptly. During further heating to the final temperature, the pressure is maintained between about 1,400 and 1,800 psig by bleeding off small quantities of solution as required. (In each example the polymer is dissolved by the time bleeding is required so that the concentration of the solution is not altered.) When the stated temperature is reached, stirring is discontinued and nitrogen gas at a pressure higher than the existing solution pressure is connected to provide and maintain the stated pressure in the autoclave during subsequent extrusion of the solution. The solution is allowed to flow from the autoclave, through a 100 mesh filter screen and a pressure-drop orifice of the stated diameter, into a chamber 0.5 in diameter by 3.31 inches long, from which the solution at the stated let-down pressure exits into the atmosphere through a spinneret of the stated dimensions. Experiments I, II and III employ a shroud comprising a slot 15 mils (381 microns) wide by 600 mils (15,250 microns) long cut into the down-stream face of the spinneret to a depth of 30 mils (763 microns), with the spinneret orifice centered with respect to the length and width of the slot. As described earlier, a suitable shroud generally assists in achieving high tenacity plexifilaments, and the particular shaped shroud employed in this instance also tends to generate a plexifilament in a flattened tape or ribbon form rather than the cylindrical form normally produced from an unshrouded cylindrical spinneret. All of the polymers in Examples I through VI fail to exhibit small-angle X-ray diffraction.

Table II lists the properties determined for the products of Examples I through VI. The average fibril thickness listed in Table II are determined with the interference microscope by observing numerous fibrils (e.g., about 50) from each plexifilament sample. A portion of the plexifilament is immersed in water containing a wetting agent (Triton X-100), frozen and cut to about one-half cm. length. The ice matrix is allowed to melt, the sample is washed with distilled water and allowed to dry. The sample is placed in an immersion oil of refractive index 1.40 and the thicknesses of the individual fibrils estimated assuming a polymer index of refraction of 1.50. (Since the refractive indices of all the present polymers are actually slightly larger than 1.50, these optical thicknesses will tend to be slightly greater than the actual thicknesses.) The thicknesses listed are visual averages for the fibrils in the 1/2-cm. test sample. In each case these fibrils are multilayered aggregates of individual film-fibrils less than 1 micron thick, which film-fibrils exhibit uniaxial molecular orientation. The plexifilaments of Example II can be formed into sheets with excellent electrical insulation properties. All the plexifilaments may be used in fabric constructions (either with or without an intervening drawing step to reach even higher tenacities), and in various other applications mentioned earlier.

TABLE IA.—INGREDIENTS

| Example | Polymer | | Solvent | | Additive | |
|---|---|---|---|---|---|---|
| | Type | Wt. (gm.) | Type | Wt. (gm.) | Type | Wt. (gm.) |
| I | Polycarbonate,[1] (Lexan), intrinsic viscosity 0.63 | 5,820 | Methylene chloride | 11,640 | Fluorotrichloromethane | 1,940 |
| II | Polysulfone,[2] melt flow rate 3.5*** | 3,900 | do | 15,600 | | |
| III | Polyvinyl chloride, inherent viscosity 1.40**** | *1,980 | do | 15,246 | 1,1,2 Trichloro-1,2,2-trifluoroethane | 1,980 |
| IV | Polystyrene, melt flow rate 4.55***** | 4,475 | do | 6,713 | Fluorotrichloromethane | 6,713 |
| V | Poly(methyl methacrylate), intrinsic viscosity about 1.3 | 2,280 | do | 12,920 | do | 3,800 |

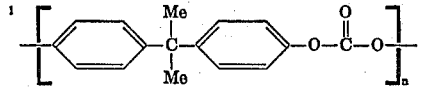

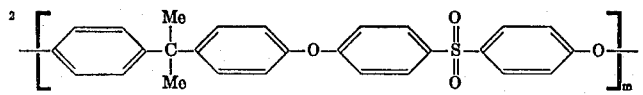

[3] 96/4 acrylonitrile/sodium styrene sulfonate.
*Change included an additional 594 gm. of a stabilizer (Argus Chemical's Mark-356).
**Isooctylphenoxypolyethoxyethanol (Triton X-100, Rohm & Haas Co.).
*** At 350° C., 44 p.s.i., dg./min.
**** ASTM D-1243 A, cyclohexanone 0.2 gr./100 ml.
***** MFR at 230° C. grams/10 minutes-ASTM 1238-62T.

TABLE IB.—PROCESS CONDITIONS

| Example | Pressure letdown, orifice D, mils (microns) | Spinneret | | | | | Spinning conditions | | | Letdown pres., p.s.i.g. (kg./cm.²) |
|---|---|---|---|---|---|---|---|---|---|---|
| | | Orifice | | | Entrance angle | Shroud | Heating and mix. time (hr.) | Autoclave | | |
| | | D, mils (microns) | L, mils (microns) | | | | | Temp. (° C.) | Pres., p.s.i.g. (kg./cm.²) | |
| I | 18 (457) | 14.5 (368) | 21 (534) | | 90° | Yes | 1.0 | 228 | 1,405 (99) | 1,110 (78) |
| II | 16 (407) | 14 (356) | 20 (508) | | 120° | Yes | 1.2 | 225 | 2,065 (145) | 1,645 (116) |
| III | 18 (457) | 14.5 (368) | 21 (534) | | 90° | Yes | 0.6 | 214 | 1,790 (126) | 1,300 (91) |
| IV | 15 (381) | [1] 10×20 (254×508) | 20 (508) | | 180° | No | 1.0 | 225 | 1,960 (138) | 1,400 (98) |
| V | 18 (457) | [1] 10×20 (25×508) | 20 (508) | | 180° | No | 1.0 | 227 | 1,560 (110) | 1,200 (84) |
| VI | 24 (610) | 16 (407) | 15 (381) | | 45° | No | 1.0 | 223 | 1,725 (121) | 1,525 (107) |

[1] Rect.

TABLE II.—PRODUCTS

| Example | Tenacity (g.p.d.) | Denier | Free fibril count fibrils/ 1,000 den./1.0 mm. | Density | | Deviation from bulk pol. (percent) | Surface area (m.²/g.) | Average fibril thickness (μ) |
|---|---|---|---|---|---|---|---|---|
| | | | | Plexifilament (g./cc.) | Polymer | | | |
| I | 1.51 | 111 | 2,700 | [2] 1.196 | [1] 1.195 | +.08 | 25.5 | 2 |
| II | 1.02 | 125 | 4,800 | [2] 1.231 | [1] 1.239 | −.65 | 25.5 | 4 |
| III | 0.67 | 204 | 1,960 | [2] 1.391 | [2] 1.401 | −.71 | 2.6 | 3 |
| IV | 0.58 | 156 | 5,769 | [3] 1.060 | [3] 1.040 | +1.92 | 68.2 | 3 |
| V | 0.11 | 128 | 6,240 | [2] 1.198 | [2] 1.194 | +.34 | 2 | 3 |
| VI | 0.90 | 356 | 395 | [1] 1.194 | [1] 1.190 | +.30 | 5.2 | 4 |

[1] Density gradient tube, using CCl₄ and heptane.
[2] Pycnometer, using 1% "Triton" X-100 in water.
[3] Density gradient tube, using NaCl and water.

The embodiments of the invention in which an exclusive property or privilege is claimed are defined as follows:

1. A plexifilament composed of a multiplicity of fibrils positioned in general alignment with the plexifilament axis and interconnected at their ends to form a continuous, integral, three-dimentional plexus, the fibrils being less than 5 microns thick and being composed of film-fibril elements of a synthetic, organic, non-crystalline polymer which exhibits no small angle X-ray diffraction, the film-fibril elements being less than 1 micron thick and exhibiting uniaxial molecular orientation, the plexifilament having a minimum surface area of 2 m.$^2$/g., a minimum tenacity of 0.1 gpd, a minimum free fibril count of 50/thousand denier/0.1 mm. length, and a density within 2 percent of that of the solid materials from which the plexifilament is made.

2. A plexifilament as defined in claim 1 wherein the film-fibril elements are approximately less than 0.5 micron thick.

3. A plexifilament as defined in claim 1 having a minimum tenacity of 0.5.

4. A plexifilament as defined in claim 1 having free fibril count of at least 1,000/thousand denier/0.1 mm. length.

5. A plexifilament as defined in claim 1 wherein the polymer is a member of the group consisting of the polycarbonates and the polysulfones.

6. A plexifilament as defined in claim 1 wherein the polymer is a member of the group consisting of polyvinyl chloride and polystyrene.

7. A plexifilament as defined in claim 1 wherein the polymer is a polyacrylonitrile.

* * * * *

PO-1050
(5/69)

UNITED STATES PATENT OFFICE
CERTIFICATE OF CORRECTION

Patent No. 3,655,498  Dated April 11, 1972

Inventor(s) Rudolph Woodell

It is certified that error appears in the above-identified patent and that said Letters Patent are hereby corrected as shown below:

Column 9, Table IA, Example VI has been left out completely and should read as follows:

| Example | Polymer Type | Wt.(gm.) | Solvent Type | Wt.(gm.) | Additive Type | Wt.(gm.) |
|---|---|---|---|---|---|---|
| VI | Polyacrylonitrile,[3] Intrinsic viscosity 1.5 | 4620 | Acetonitrile/ Water | 6160/ 3850 | Surfactant** | 770 |

Column 9, Table IB, Example V of the "Orifice - D, mils (microns)" column should read -- (254X508) -- instead of "(25X508)".

Signed and sealed this 10th day of October 1972.

(SEAL)
Attest:

EDWARD M. FLETCHER, JR.
Attesting Officer

ROBERT GOTTSCHALK
Commissioner of Patents